United States Patent Office 2,960,495
Patented Nov. 15, 1960

2,960,495

POLYMERS CONTAINING POLYSULFIDE AND SPIROBI(META-DIOXANE) GROUPS

Harry A. Stansbury, Jr., South Charleston, and Howard R. Guest, Charleston, W. Va., assignors to Union Carbide Corporation, a corporation of New York No Drawing. Filed July 16, 1957, Ser. No. 672,114

12 Claims. (Cl. 260—79.1)

This invention relates to novel spirobi(meta-dioxane) containing polymers and their preparation. In one aspect, this invention relates to a method of producing polymers containing spirobi(meta-dioxane) and sulfur groups. In another aspect, this invention relates to a method for producing polymers containing substituted spirobi(meta-dioxane) groups connected by sulfur linkages which are useful as intermediate reactants and as accelerators for curing rubber.

It is an object of the present invention to provide a method for producing polymers containing spirobi(meta-dioxane) and sulfur groups.

It is another object of this invention to provide polymers which contain spirobi(meta-dioxane) groups connected through sulfur linkages.

It is a further object of this invention to provide spirobi(meta-dioxane) and sulfur containing polymers which have active sites that can react under suitable conditions.

Other objects and advantages of the present invention will become apparent to those skilled in the art from the following description.

The above objects are achieved by reacting together an inorganic polysulfide salt and a 3,9-haloalkyl derivative of a spirobi(meta-dioxane) compound or a mixture thereof. The halogenated derivatives may be derived by hydrohalogenation of compounds having the formula:

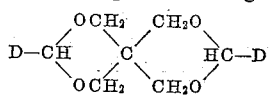

wherein D is selected from the group consisting of (R—CH=CH—) and

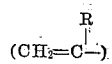

and R is selected from the group consisting of hydrogen and lower alkyl.

The 3,9-divinylspirobi(meta-dioxane) compounds which are conveniently and economically prepared from widely available starting materials are those which are unsubstituted or have a methyl substituted on each vinyl group. Such 3,9-divinylspirobi(meta-dioxane) compounds are produced by the reaction of pentaerythritol with acrolein, methacrolein and crotonaldehyde, respectively. Alternate nomenclature for the term "spirobi(meta-dioxane)" is "2,4,8,10-tetroxaspiro(5.5)undecane."

3,9-divinylspirobi(meta-dioxane) compounds which contain a terminal methylene group are of particular advantage for ease of reaction, quality of product, etc. Their use, therefore, generally is the most preferred.

The preferred method for preparing the 3,9-divinylspirobi(meta-dioxane) starting materials is by the reaction of a mole of pentaerythritol with two moles of acrolein or an acrolein derivative in the presence of an acid catalyst such as p-toluenesulfonic acid. This well-known synthetic method is published in detail in Schulz and Wagner, Angew. Chemie, 62, 118 (1950) and in German Patents 858,406; 870,032 and 885,006.

The 3,9-divinylspirobi(meta-dioxane) compounds which contain terminal methylene groups are derived from the reaction of pentaerythyritol with α,β-unsaturated aldehydes such as acrolein, alpha-methylacrolein, alpha-ethylacrolein, alpha-propylacrolein, alpha-butylacrolein, etc.

When acrolein is the starting material an unsubstituted 3,9-divinylspirobi(meta-dioxane) is obtained:

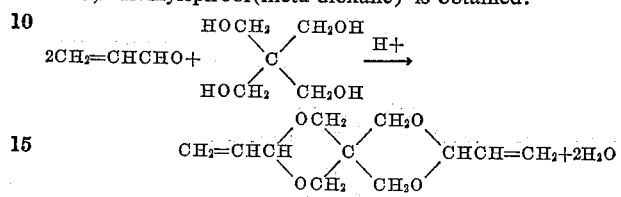

When the condensation is conducted with (a) alpha-methylacrolein or (b) crotonaldehyde, then methyl-substituted 3,9-divinylspirobi(meta-dioxanes) are obtained:

(a)
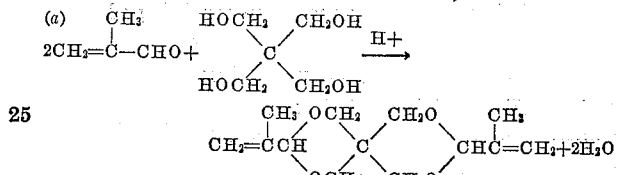

(b)
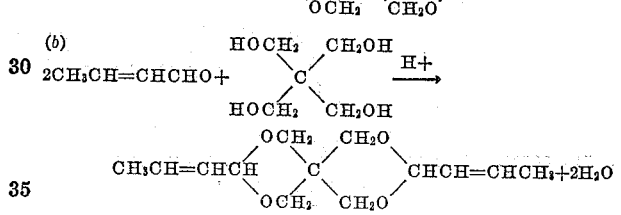

As previously mentioned, in the processes of this invention novel polymers are produced by reacting an inorganic polysulfide reagent with a 3,9-haloalkyl derivative of a spirobi(meta-dioxane) or a mixture thereof. The particular halogenated derivatives preferred are the type that may be obtained by hydrohalogenation of the above described 3,9-divinylspirobi(meta-dioxane) compounds or a mixture thereof. The methods of preparing these halogenated derivatives are those which allow the olefinic position in the spirobi(meta-dioxane) to become hydrohalogenated. A particular illustration of the preparation of 3,9-haloalkylspirobi(meta-dioxane) intermediates useful in this present invention is the reaction of hydrogen chloride with 3,9-divinylspirobi(meta-dioxane) which proceeds in the following manner to give a mixture of products:

(A)
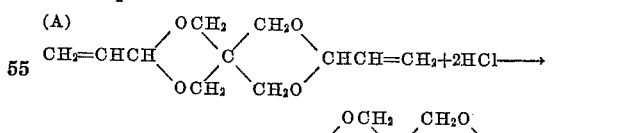

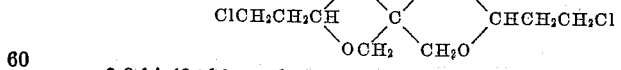

3,9-bis(2-chloroethyl)spirobi(meta-dioxane)

(B)
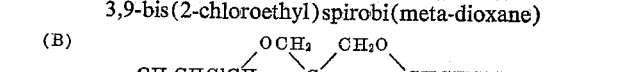

3,9-bis(1-chloroethyl)spirobi(meta-dioxane)

(C)
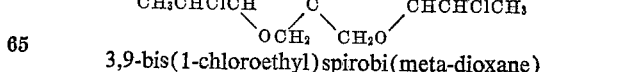

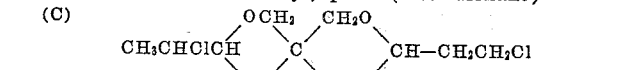

3-(1-chloroethyl)-9-(2-chloroethyl)spirobi(meta-dioxane)

A sample of isomer B prepared by the condensation of 2-chloropropionaldehyde and pentaerythritol has a melting point of 106–109° C. as compared with a melting point of 58–63° C. for the mixed isomers prepared by the addition of hydrogen chloride to the divinylspirobi compound. These chloro derivatives are new to the art. They are disclosed in copending patent application "3,9-Bis-Aminoethylspirobi (Meta-Dioxanes)" by H. A. Stansbury, Jr. and H. R. Guest, Serial No. 601,372. The chlorine derivatives are convenient and satisfactory for the processes of this invention; the corresponding bromine, fluorine and iodine derivatives may be used if desired, but they may not give satisfactory results in all cases. The hydrohalogenation reactions proceed smoothly by simply mixing together hydrogen halide and a divinylspirobi (meta-dioxane) at temperatures which allow a controllable rate of reaction.

The 3,9-haloalkylspirobi(meta-dioxane) reactants useful in this present invention are those corresponding to the formula:

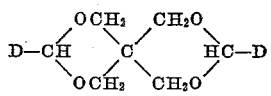

wherein D is selected from the group consisting of

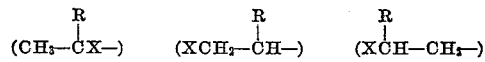

and (RCH$_2$—CHX—); R is selected from the group consisting of hydrogen and lower alkyl; and X is halogen.

The inorganic polysulfides useful for converting the intermediate halogen-containing spirobi(meta-dioxane) compounds to polysulfide polymer products comprise sodium polysulfide, potassium polysulfide and lithium polysulfide. Other polysulfides, e.g., alkaline earth metal polysulfides, may be found applicable and desirable in some cases. The formula for an inorganic polysulfide corresponds to an average composition of a mixture of compounds. For example, sodium tetrasulfide in the average composition formula for mixture of $Na_2S$, $Na_2S_2$, $Na_2S_3$, $Na_2S_4$, $Na_2S_5$, $Na_2S_6$, etc. For the purposes of this invention, the inorganic polysulfides which are useful may have formulas which range from $M_2S_2$ to $M_2S_{10}$, where M is an alkali metal ion.

The novel polysulfided spirobi(meta-dioxane) polymers obtained by the methods of this present invention are those which correspond to the general formula:

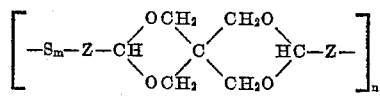

wherein Z is selected from the group consisting of

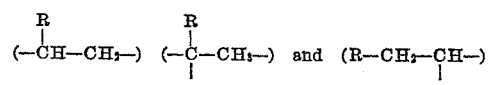

R being selected from the group consisting of hydrogen and lower alkyl; m is an integer which can vary between 2 and 10; and n is an integer which can vary between 2 and 20.

A specific example of the production of the novel polymers of this invention is illustrated in the following reaction scheme:

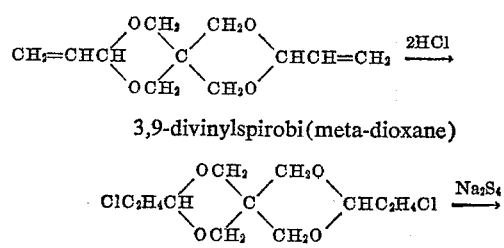

3,9-divinylspirobi(meta-dioxane)

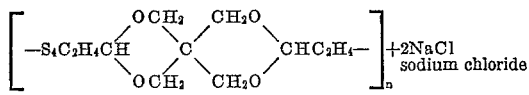

3,9-bis (chloroethyl)spirobi(meta-dioxane)

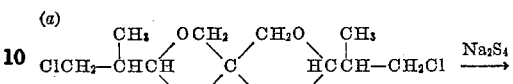

Other examples of polymers which are within the scope of this invention are as follows:

(a)

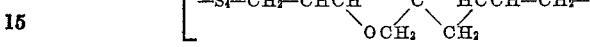

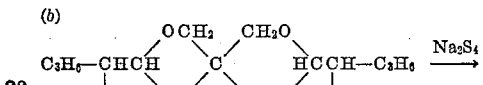

(b)

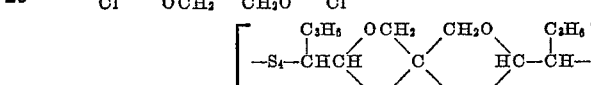

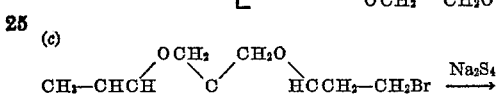

(c)

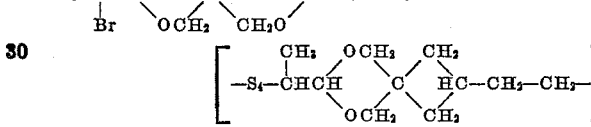

(d)

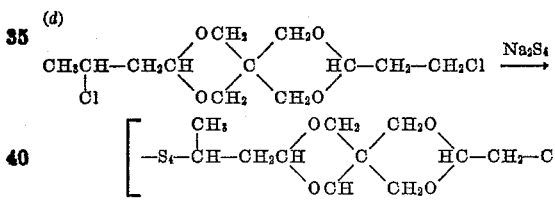

The 3,9-haloalkylspirobi(meta-dioxane) compounds prepared by hydrohalogenation of 3,9-divinylspirobi (meta-dioxanes) can be pure halogenated derivatives, i.e., one isomeric form, or they can be mixtures, depending on the kind of substituents on the vinyl groups, the hydrogen halide used and on the reaction conditions. The mixtures may be resolved into components and each reacted separately with an alkali polysulfide, or the mixtures may be reacted directly without resolution. The use of mixtures of 3,9-haloalkylspirobi(meta-dioxane) derivatives in reaction with an alkali polysulfide is convenient and practical, and a wide variety of polymer products can be obtained.

The reaction of inorganic polysulfide and 3,9-haloalkylspirobi(meta-dioxane) proceeds well under moderate conditions. A preferred method is to add a solution of 3,9-haloalkylspirobi(meta-dioxane) to a mixture of an inorganic polysulfide and a catalyst such as magnesium chloride. Other suitable catalysts are zinc chloride and aluminum chloride. Exclusion of the catalyst causes the reactions to proceed at a much slower rate. The solvent for the spirobi(meta-dioxane) reactant may be dioxane, diethyl ether of diethylene glycol, tetrahydrofuran or any other solvent which has the proper solubility properties and is inert to the reaction conditions. The reaction temperature may vary between about 30° and 180° C., with 70° to 110° C. being the preferred range. The reaction time may vary between about 0.5 and 50 hours, depending on the particular reactants being interacted and on the reaction temperature.

The mole ratio of inorganic polysulfide to 3,9-haloalkylspirobi(meta-dioxane) may vary between about 3:1 and 0.5:1, with 1.5:1 to 1:1 being a practical range. The amount of catalyst may vary from about 1 percent to 10 percent based on the weight of inorganic polysulfide.

The products of this present invention have chemical and commercial application. They may be used as accelerators for curing rubber and as intermediates in the production of other chemicals.

The unique properties of these liquid and solid sulfur-containing polymers can be imparted to other materials such as natural and synthetic polymers and elastomers by mixture or combination of the polymers with the said materials.

Further application of polysulfide spirobi(meta-dioxane) polymers is based on their ability to be cross-linked. They have outstanding solvent and oil resistance, they are impervious to vapor and gas, and they are resistant to the action of oxygen, light and ozone.

The crosslinking of polysulfide spirobi(meta-dioxane) polymers may be accomplished by treatment with zinc oxide, zinc peroxide, lead dioxide, cupric oxide, magnesium oxide, butyl peroxide, benzoyl peroxide, trichloroacetyl peroxide, hydrogen peroxide and acetyl peroxide.

Some of the products of this invention may be used as the flexibilizing constituents in resin-based adhesive and potting compounds. They also find application in the manufacture of gaskets, putties, cements and other permanent oil- and weather-resistant putties. Carbon blacks and other reinforcing pigments may be mixed with the polymers.

The following examples will serve to illustrate particular embodiments of this invention:

*Example 1*

A solution of 3,9-divinylspirobi(meta-dioxane) (170 grams; 0.8 mole) in an equal weight of diethyl ether of diethylene glycol solvent was stirred at 0–10° C. while dry hydrogen chloride gas was fed until 59 grams (1.6 moles) was absorbed.

A mixture of sodium sulfide monohydrate (240 grams; 1 mole), sulfur (96 grams, 3 atomic weights) and water (99 milliliters) was stirred and heated to form 1 mole of sodium tetrasulfide in aqueous mixture. A solution of magnesium chloride catalyst (7 grams) in water (10 milliliters) was added to the tetrasulfide mixture.

The resulting mixture was stirred and heated at a temperature of 80–85° C. while the diethyl ether of diethylene glycol solution was added dropwise over a period of one hour. After a reaction period of 2.5 hours at 100° C., the mixture was poured into water (2 liters) with stirring. Acetic acid (47 milliliters) was added to make the mixture weakly acidic. The solid product was filtered off, washed with methanol and dried under vacuum at 30° C. The dry, rubber-like polymer was insoluble in hot acetone and in hot toluene. The overall yield was 90 percent based on 3,9-divinylspirobi(meta-dioxane).

*Analysis.*—Calc. for $C_{11}H_{18}O_4S_4$: C, 38.6; H, 5.3; S, 37.4. Found: C, 37.8; H, 6.0; S, 31.0.

*Example 2*

The experiment in Example 1 was repeated with dioxane as the solvent instead of diethyl ether of diethylene glycol. After the gummy polymeric product was washed with methanol it was dried at room temperature under vacuum.

*Analysis.*—Calc. for $C_{11}H_{18}O_4S_4$: C, 38.6; H, 5.3; S, 37.4. Found: C, 37.4; H, 6.5; S, 26.5.

*Example 3*

This example illustrates the ability of polysulfided spirobi-metal-dioxane) polymers to be cross-linked. The polymer from Example 1 was cross-linked to a slight extent with zinc oxide and to a considerable degree with tert. butyl peroxide.

|  | A | B |
|---|---|---|
| Formulation grams: |  |  |
| polymer described in Example 1 | 30 | 30 |
| zinc oxide | 3 |  |
| tert-butyl peroxide |  | 0.3 |
| stearic acid | 0.15 | 0.15 |
| Milling temperature, ° C | 30 | [2] 30–160 |
| Milling time, minutes | 5 | 10 |
| Curing temperature, ° C | 140 | 140 |
| Curing time, minutes | 45 | 45 |
| Physical properties on cured compositions: |  |  |
| tensile, p.s.i | too weak | 700 |
| elongation, percent | too weak | 300 |
| load at 100% elongation, p.s.i |  | 700 |
| hardness, Durometer A | [1] 8 | 85 |
| hardness, Durometer D |  | 31 |

[1] Same hardness as polymer described in Example 1.
[2] Partially cross-linked on mill.

*Example 4*

This example illustrates that polysulfided spirobi(meta-dioxane) polymers are effective accelerators for the curing of rubber.

The following formulations were compounded on a two-roll mill at 40°–75° C.

(a)—100 gms. of natural rubber
    1 gm. of "Age Rite" powder antioxidant
    5 gms. of zinc oxide
    2 gms. of sulfur
    3 gms. of stearic acid
    50 gms. of "Kosmobile 77EPC" carbon black
    1 gm. of polymer described in Example 2

(b)—Same as above except the polymer described in Example 2 was omitted.

Both (a) and (b) were cured 60 minutes at 140° C. respectively in positive molds under pressure. The cured compositions had the following properties:

|  | A | B |
|---|---|---|
| Tensile, p.s.i | 700 | 380 |
| Elongation, percent | 400 | 375 |
| Load at 300% elongation, p.s.i | 400 | 200 |
| Hardness, Durometer A | 35 | 14 |

Having described our invention, we claim:

1. The class of polymers consisting essentially of structures represented by the formula:

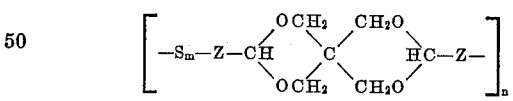

wherein Z is selected from the group consisting of

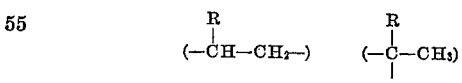

and

R being selected from the group comprising hydrogen and lower alkyl; $m$ is an integer of from 2 to 10; and $n$ is an integer of from 2 to 20.

2. A polymer according to claim 1 wherein R is hydrogen.

3. A polymer according to claim 1 wherein R is methyl.

4. A process for producing novel sulfur-containing polymers which comprises reacting together an alkali metal polysulfide and a compound of the formula:

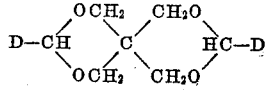

wherein D is selected from the group consisting of

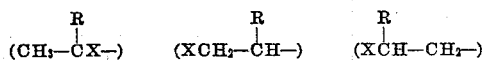

R being selected from the group consisting of hydrogen and lower alkyl; and X is halogen.

5. The process of claim 4 wherein the alkali metal polysulfide is a sodium polysulfide or a mixture thereof having the formula: $Na_2S_m$, wherein $m$ is an integer of from 2 to 10.

6. The process of claim 4 wherein the alkali metal polysulfide is a potassium polysulfide or a mixture thereof having the formula: $K_2S_m$, wherein $m$ is an integer of from 2 to 10.

7. The process of claim 4 wherein the alkali metal polysulfide is a lithium polysulfide or a mixture thereof having the formula: $Li_2S_m$, wherein $m$ is an integer of from 2 to 10.

8. The process of claim 4 wherein X is chlorine.

9. The process of claim 4 wherein X is bromine.

10. The process of claim 4 wherein X is fluorine.

11. A process for producing novel sulfur-containing polymers which comprises reacting at a temperature between 30° C. and 180° C. an oxidizing agent and a polysulfided spirobi(meta-dioxane) product obtained by the reaction of an alkali metal polysulfide with a 3,9-haloalkyl spirobi(meta-dioxane) compound.

12. The novel polymers obtained by the process of claim 11.

References Cited in the file of this patent

UNITED STATES PATENTS

| | | |
|---|---|---|
| 2,495,145 | Smith et al. | Jan. 17, 1950 |
| 2,532,369 | Patrick et al. | Dec. 5, 1950 |
| 2,716,636 | Davis | Aug. 30, 1955 |
| 2,700,658 | Signaigo | Jan. 25, 1955 |
| 2,787,608 | Gregory | Apr. 2, 1957 |

FOREIGN PATENTS

| | | |
|---|---|---|
| 858,406 | Germany | Oct. 16, 1952 |